United States Patent [19]
Bell et al.

[11] Patent Number: 5,516,493
[45] Date of Patent: May 14, 1996

[54] METHOD AND APPARATUS FOR PRODUCING OZONE BY CORONA DISCHARGE

[76] Inventors: Maxwell G. Bell, 16 Whitehall Road, Kenthurst, New South Wales 2156, Australia; Stephen J. Smith, 22 Blackwattle Place, Alfords Pointers, New South Wales 2234, Australia; David T. Pratt, 30 Kuroki Street, Penshurst, New South Wales 2222, Australia; Matthew P. Sharpe, 124 Mount Street, Coogee, New South Wales 2034, Australia; Dale C. Cable, 9 John Sulman Place, St. Clair, New South Wales 2759, Australia

[21] Appl. No.: 964,082
[22] PCT Filed: Feb. 21, 1992
[86] PCT No.: PCT/AU92/00061
§ 371 Date: Jan. 29, 1993
§ 102(e) Date: Jan. 29, 1993
[87] PCT Pub. No.: WO92/14677
PCT Pub. Date: Sep. 3, 1992

[30] Foreign Application Priority Data
Feb. 21, 1991 [AU] Australia ................. 71368/91

[51] Int. Cl.⁶ ................................................. C01B 13/11
[52] U.S. Cl. .................. 422/186.07; 422/186.18; 422/907
[58] Field of Search ............... 422/186.07, 186.18, 422/907

[56] References Cited
U.S. PATENT DOCUMENTS

| | | |
|---|---|---|
| 254,424 | 2/1882 | Yost . |
| 1,149,254 | 8/1915 | Dumars . |
| 2,936,279 | 5/1960 | Rindtorff . |
| 3,457,160 | 7/1969 | Fortier . |
| 3,671,417 | 6/1972 | Louboutin . |
| 3,677,931 | 7/1972 | O'Hare . |
| 3,730,874 | 5/1973 | Trub . |
| 3,766,051 | 10/1973 | Bollyky . |
| 3,899,684 | 8/1975 | Tenney . |
| 3,963,625 | 6/1976 | Lowther . |
| 4,214,995 | 7/1980 | Saylor ........................ 250/539 |
| 4,410,495 | 10/1983 | Bassler et al. . |
| 4,417,966 | 11/1983 | Krauss et al. . |
| 4,614,573 | 9/1986 | Masuda . |
| 4,725,412 | 2/1988 | Ito . |
| 4,774,062 | 9/1988 | Heinemann ............... 422/186.07 |
| 4,834,948 | 5/1989 | Schmiga . |
| 4,908,189 | 3/1990 | Staubach ................... 422/186.19 |
| 4,960,570 | 10/1990 | Mechtersheimer ......... 422/186.21 |
| 4,986,908 | 1/1991 | Hirth et al. ............... 422/186.19 |
| 5,008,087 | 4/1991 | Batchelor ................. 422/186.22 |
| 5,093,087 | 3/1992 | Freeman .................. 422/180.15 |

FOREIGN PATENT DOCUMENTS 173692 1/1922 United Kingdom .

Primary Examiner—Donald P. Walsh
Assistant Examiner—Daniel Jenkins
Attorney, Agent, or Firm—Collier, Shannon, Rill & Scott

[57] ABSTRACT

The present invention relates to a tubular ozone generator which uses a novel electrode structure wherein a wound electrode has a solid insulator between the turns of the windings.

24 Claims, 5 Drawing Sheets

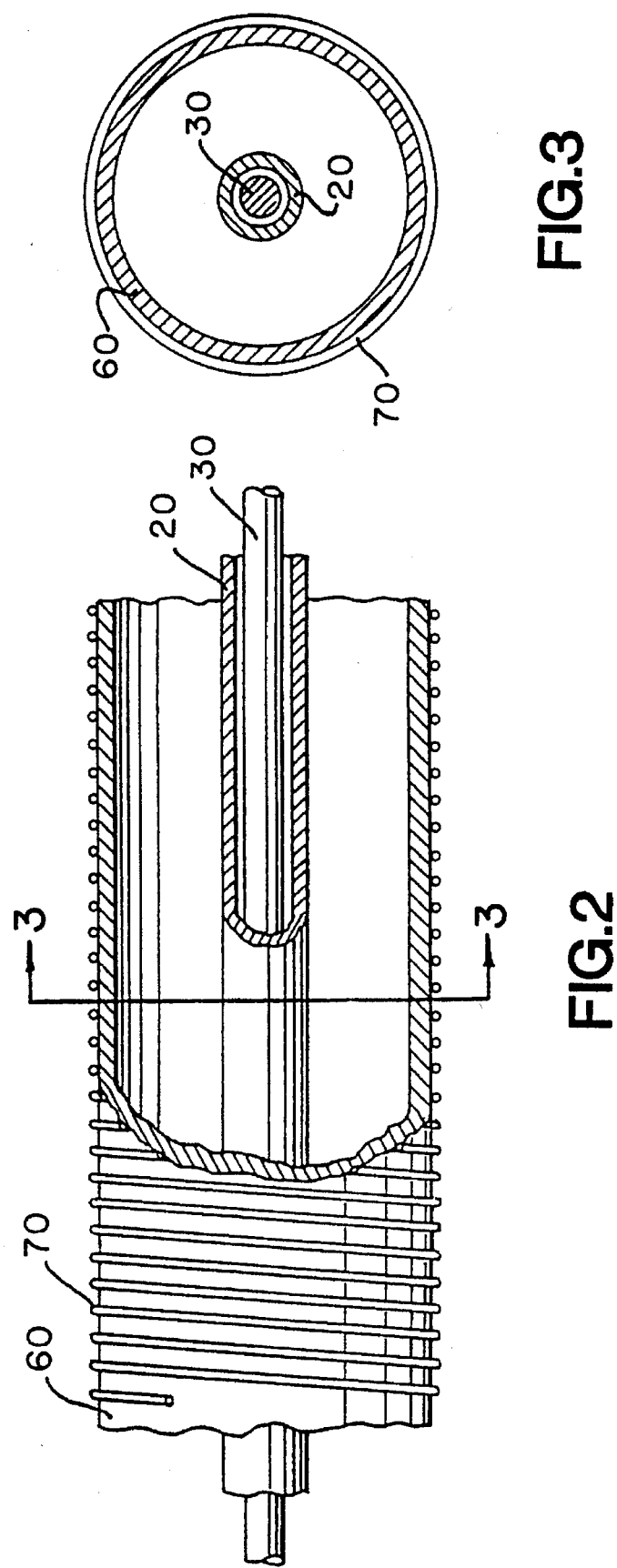

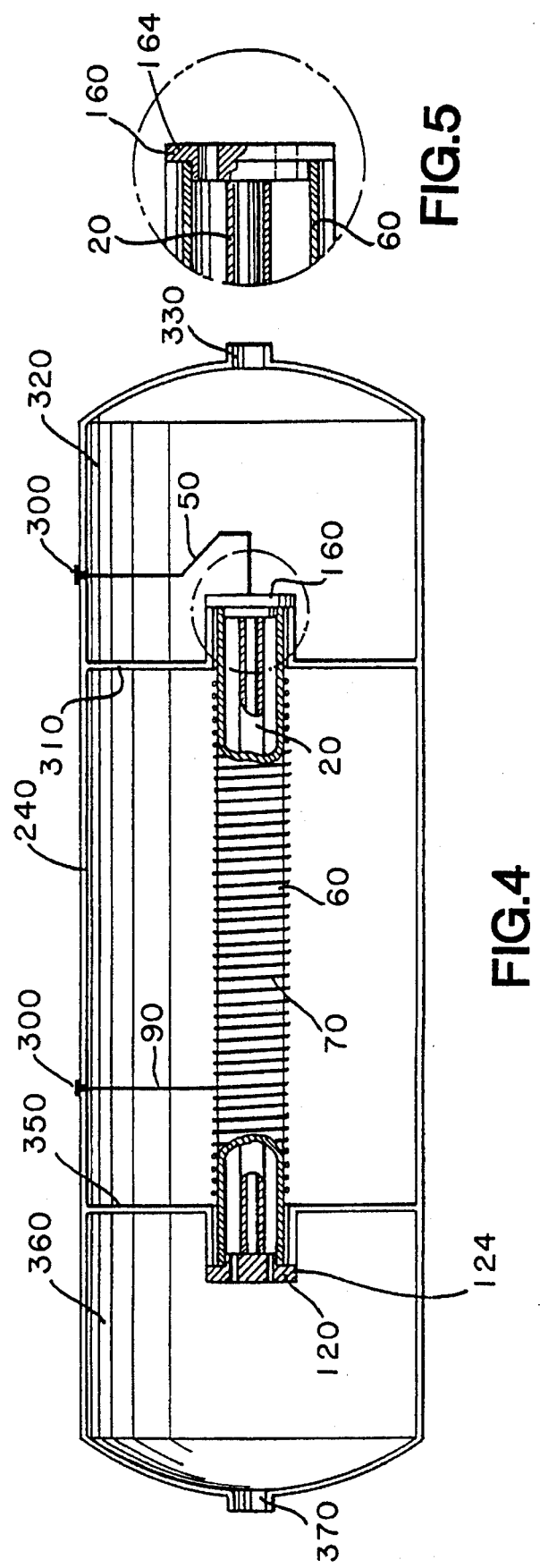

METHOD AND APPARATUS FOR PRODUCING OZONE BY CORONA DISCHARGE

The present invention relates to an apparatus and method for producing ozone from a gas containing molecular oxygen, by means of a corona discharge.

BACKGROUND OF THE INVENTION

Ozone is a strong oxidizing agent. It has many uses in sanitation and sterilization: as a germicide, bactericide, or a general antiseptic. One particular use of ozone, or ozonated air, is in the purification of waste and wastewater, especially in the secondary or tertiary treatment of sewage, or oxidation of industrial waste either liquid or gaseous. It is also used in various processing steps in the manufacturing sector.

In the context of sterilization or sanitation, ozone has a number of desirable characteristics. First, it is, relative to other sanitation and sterilization agents, environmentally safe. Although it is caustic, requiring certain safeguards in storage, handling and use, ozone occurs naturally through a variety of chemical pathways. Its degradation product is elemental oxygen. Ozone is a gas at room temperature and is handled easily, without many of the hazardous material handling requirements associated with alcohols and/or volatile hydrocarbons.

There are several known methods for producing ozone from air or another oxygen-containing gas. A number of the known commercially used processes for making ozone employ an electrical discharge. Oxygen, or a gas containing molecular oxygen typically air is passed between two electrodes separated by a dielectric material. The electrical discharge converts a portion of the gas to ozone and an ozone enriched gas is drawn off from the area through which the current passes.

Typically, the types of apparatus which have been used to produce ozone have two electrodes, separated by a dielectric barrier, and a space for the fast flow of a gas containing molecular oxygen. The gas flows through the region between the electrodes, through which a high electrical discharge passes. Different arrangements of these elements are known. A common arrangement is for the two electrodes to be in the shape of concentric tubes. In this configuration, the feed gas flows through the annular gap between the two tubes. The electrodes are separated by a dielectric material, usually glass. The outer tube can be made of stainless steel while the inner electrode may comprise a thin metal layer deposited on the inside of the dielectric glass tube. Typically, a commercial ozone generator will comprise a number of these electrode pairs, in order to produce a sufficient quantity of ozone for the desired purpose.

In various of the known methods for producing ozone, prior to the present invention, the process described above is limited by low efficiencies of conversion of the gas containing oxygen into ozone, relative to the amount of electrical energy input into the apparatus. Known apparatus transfer a substantial portion of their input electrical energy into heat, raising the temperature of the apparatus as well as that of the discharged gas. Thus, they typically require cooling systems.

Cooling systems for ozone generating equipment are typically expensive, comprising a substantial portion of the total capital cost of the apparatus. In addition, cooling systems require further energy input, further reducing the energy efficiency of the conversion of feed gas into ozone. Moreover, cooling equipment imposes additional maintenance requirements on the operation of the ozone generating unit. The cooling system must be operational in order for the system to deliver ozone at a usable temperature in many applications. For example, the air discharge temperature of existing units can reach 300° C., when the cooling system fails. In addition to these problems, the known apparatus for producing ozone typically have only one dielectric barrier. The remaining electrode, therefore, is subject to degradation by the ozone produced in the apparatus.

The relatively low energy efficiency of existing apparatus for producing ozone leads to the consumption of large amounts of electricity to produce ozone using apparatus prior to the present invention. This imposes additional environmental burdens.

When considering the inputs necessary to produce ozone, it is important to consider the additional burdens imposed by the production of the electrical energy used in the relatively inefficient known processes for producing ozone. The cost of producing even low concentrations of ozone is extremely high, relative to the competing means for sanitizing and sterilizing. The high cost of producing ozone tends to discourage large commercial and industrial use of ozone as a sterilizing or sanitizing agent, and in particular, in the purification of water or wastewater.

Accordingly, there is a need for a low cost, energy efficient ozone generator that is simple, compact, and economical. Moreover, such an apparatus must be reliable, inexpensive, and easy to use and maintain. Prior approaches do not adequately address the problem of providing such an ozone generator. It is, therefore, desirable to produce an efficient means of making ozone that does not require cooling systems, and in which the discharge temperature of the air has been raised only minimally.

OBJECTS OF THE INVENTION

The primary object of the present invention, therefore, is to provide an apparatus and method for generating ozone that is simple and has relatively low production costs.

An additional object of the present invention is to provide an apparatus and method for producing ozone that is more energy efficient than previously known apparatus and processes.

A further object of the present invention is to provide an apparatus and method for producing ozone that has lower capital investment costs than competing technologies.

Another object of the present invention is to provide an apparatus and method for producing ozone that is compact in size and uses engineered plastics to reduce the weight and size of the ozone generating units, and also has inherent electrical insulation properties.

An additional object of the present invention is to provide an apparatus and method for producing ozone that achieves efficient ozone production without significant power conditioning, namely the use of complex transformers and control equipment. Although such equipment can be utilized with the apparatus and method of the present invention to further enhance ozone production, it is the object of the present invention that it be optional and, therefore, unnecessary to achieve.

Yet, a further object of the present invention is to provide an apparatus and method for generating ozone that eliminates the requirement for a cooling system for the ozone cells or air feed.

A further object of the present invention is to provide an apparatus and method for producing ozone that provides a stable corona discharge, without arcing.

An additional object of the present invention is to provide an apparatus and method for producing ozone that reduces maintenance requirements and costs.

Another object of the present invention is to provide an apparatus and method for producing ozone that reduces the stringent air feed quality requirements that are characteristic of known ozone generating units and, in particular, the dependence of prior ozone generation equipment on the dew point.

An additional object of the present invention is to provide an apparatus and method for generating ozone that is economical in terms of power consumption.

Another object of the present invention is to provide a durable, resilient, and easily maintained ozone generator.

Additional objects and advantages of the invention are set forth, in part, in the description which follows and, in part, will be obvious from the description or may be learned by practice of the invention. The objects and advantages of the invention will be realized in detail by means of the instrumentalities and combinations particularly pointed out in the appended claims.

SUMMARY OF THE INVENTION

To achieve the objects, and in accordance with the purposes of the invention, as embodied and broadly described herein, the invention is an apparatus and method for producing ozone, comprising: first and second dielectric means, each further comprising first and second surfaces; said first dielectric means being disposed in spaced-apart relation to said second dielectric means, whereby said second surface of said first dielectric means is disposed in spaced apart and opposing relation to said second surface of said second dielectric means; first and second spacer means, for maintaining said first and second dielectric means in substantially spaced-apart relation to one another; a reaction chamber comprising the volume between said first and second dielectric means; said reaction chamber being adapted to receive a volume of gas comprising molecular oxygen; first electrode means disposed along said first surface of said first dielectric means in substantially parallel relation to said electrode means; second electrode means disposed along said second surface of said second dielectric means; means for supplying gas containing molecular oxygen to said reaction chamber; means for supplying electrical power to said first and second electrode means, to induce a corona discharge in said gas comprising molecular oxygen whereby said corona discharge converts some of said gas comprising elemental oxygen to ozone; said reaction chamber being adapted to discharge a mixed stream of gas comprising ozone and the unreacted fraction of said volume of gas comprising molecular oxygen.

In a preferred embodiment, the apparatus and method of the present invention for producing ozone from a gas containing molecular oxygen comprises: two spaced apart concentric borosilicate glass tubes between which the gas passes; the inner of said concentric tubes containing an electrode with a plurality of windings of a conductive wire electrode around its inner surface or a central rod inside its inner surface; the outer of said concentric tubes having a plurality of windings of a conducting wire electrode around its outer surface, both of said electrodes being connected to a high voltage AC electric current device, whereby the current flowing between the electrodes through the dielectric tubes and the passing gas converts at least some of the molecular oxygen to ozone.

Another aspect of the present invention concerns a method for producing ozone from a gas containing molecular oxygen which comprises passing the gas between two concentric tubes of a dielectric material, the inner of said concentric tubes containing an electrode with a plurality of windings of a conductive wire electrode around its inner surface or a central rod inside its inner surface the outer of said concentric tubes having a plurality of windings of a conducting wire electrode around its outer surface, both of said electrodes being connected to a high voltage A electric current device, whereby the current flowing between the electrodes through the dielectric tubes and the passing gas converts at least some of the molecular oxygen to ozone.

Preferably the apparatus described above is located within a casing having an inlet for the gas containing oxygen adjacent to, and at one end of, the annular passage between the two concentric tubes, and an outlet for discharging the gas containing ozone adjacent to, and at the other end of, the concentric tubes. As embodied herein, it is preferred that the inlet is a nozzle for injecting a fast moving stream of gas through the annular passage between the concentric tubes. The feed gas is air or oxygen. It is also preferred that the feed gas is compressed above atmospheric pressure and further that it is cooled to a temperature below normal operating temperatures, particular room temperature i.e. 15°–35° C. It is also preferred that the feed gas is dried to a dew point down to nominally between –40° C. to –60° C.

Preferably the electrodes are aluminum, stainless steel, or copper. It is preferred that the inner and the outer electrode is aluminum or stainless steel wire of 0.5 to 2.0 mm in diameter. Preferably adjacent windings of the wire around the circumference of the outer tube are each 0.5 to 1.0 mm apart. It is preferred that the number of windings along the tube be at least 200. For small units the number of windings is preferably at least 3, and for large units is preferably at least 300. The voltage used to produce the ozone is most preferably between 7,000 to 20,000 volts. The frequency of the AC current will normally be 50 to 700 Hz.

The rate of ozone production in the apparatus and method of the present invention will depend on the rate of gas flow through the annular space between the pair of electrodes and dielectric cylinders, the applied voltage, the number of windings, the pitch of the winding spacing, the thickness of the dielectric layers, the material of the dielectric layers, the thickness of the electric wire as well as the distance apart of the two electrodes, the frequency of the AC current and the moisture content and temperature of the applied air or oxygen. Each of these factors can be adjusted to optimize ozone production.

It is to be understood that both the foregoing general description and the following detailed description are exemplary and explanatory only and are not restrictive of the invention as claimed.

The accompanying drawings, which are incorporated herein by reference and constitute a part of this specification, illustrate one embodiment of the invention, and together with the description, serve to explain the principles of the invention.

BRIEF DESCRIPTION OF THE DRAWINGS

The invention is now discussed in more detail, with particular reference to the drawings.

FIG. 2 is a longitudinal, axial cross-section, cut-away, schematic view of a portion of a second embodiment of the apparatus of the present invention, showing only the first and second dielectric means and first and second electrodes, wherein the first electrode is a solid electrode.

FIG. 3 is a transverse cross-section, schematic diagram of the ozone generator shown in FIG. 2, taken along section A—A.

FIG. 4 is a longitudinal, axial cross-section, schematic diagram of a third embodiment of the apparatus of the present invention, showing a single unit ozone generator cell of the apparatus mounted in an outer shell casing.

FIG. 5 is an axial cross-section, detail, schematic diagram, showing one end cap section of the apparatus depicted in FIG. 4.

DESCRIPTION OF THE PREFERRED EMBODIMENT

Reference will now be made in detail to a preferred embodiment of the present invention, an example of which is illustrated in the accompanying drawings. A preferred embodiment of the invention is shown in FIG. 1 as 10.

Figure 1:
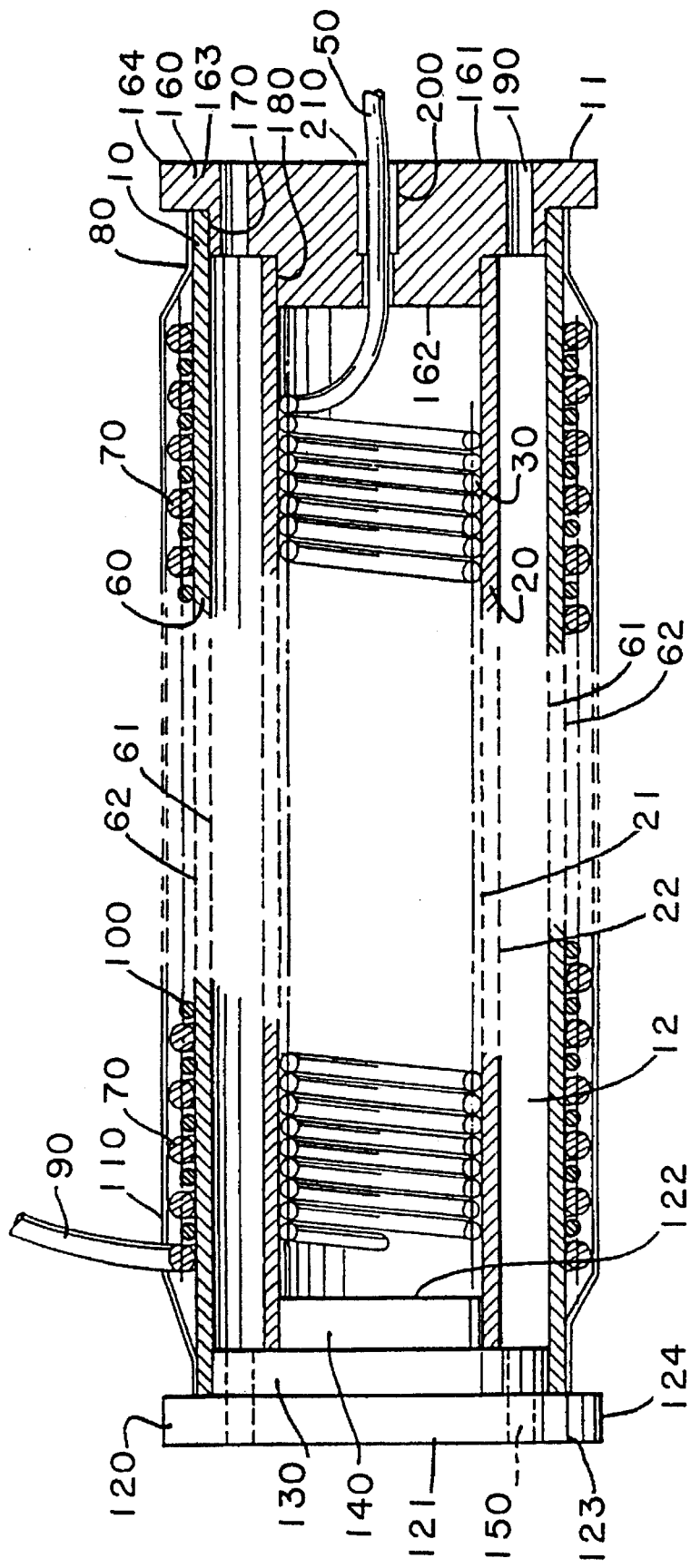
FIG. 1 is a longitudinal, axial cross-section, schematic diagram of a present preferred embodiment of the apparatus of the present invention, showing a single unit ozone generator cell of the present invention.
Figure 7:
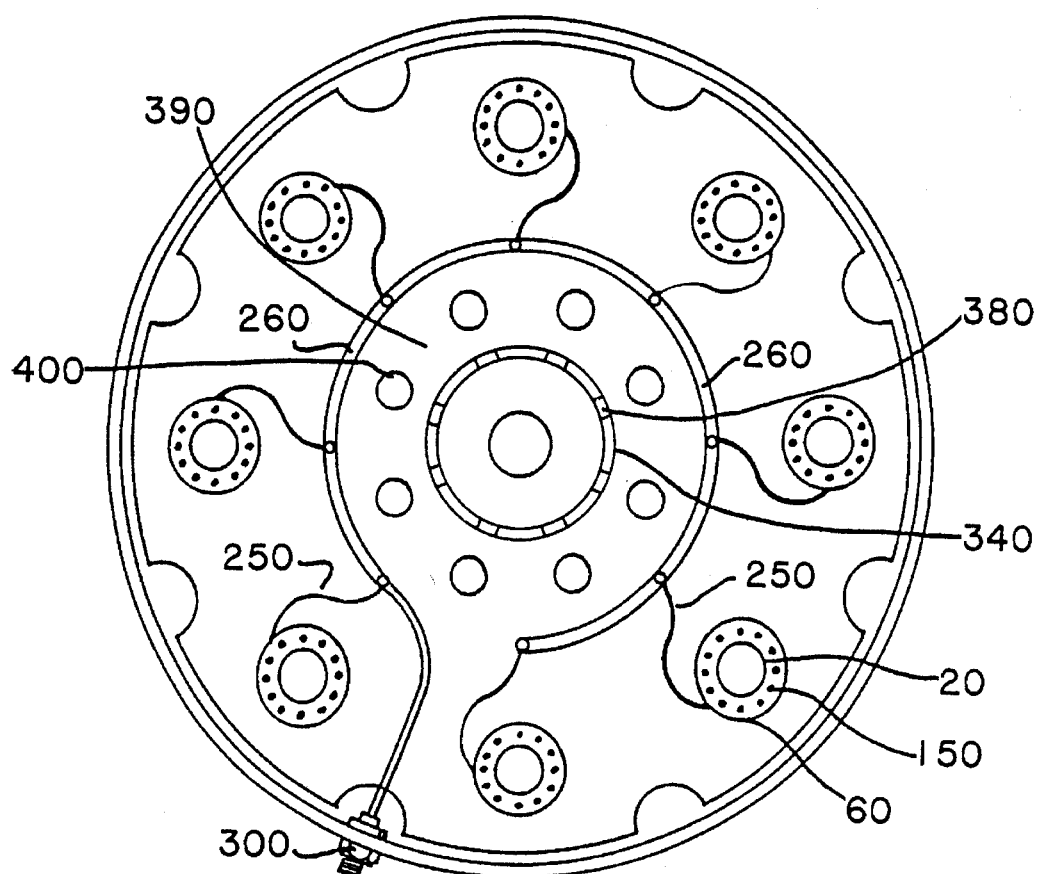
FIG. 7 is a longitudinal, transverse cross-section, schematic diagram of the ozone generator of yet a further preferred embodiment of the apparatus of the present invention as shown in FIG. 8, taken along section B—B of FIG. 8, showing the detail of the electrical attachment of the individual unit cells to the multi-cell apparatus.
Figure 8:
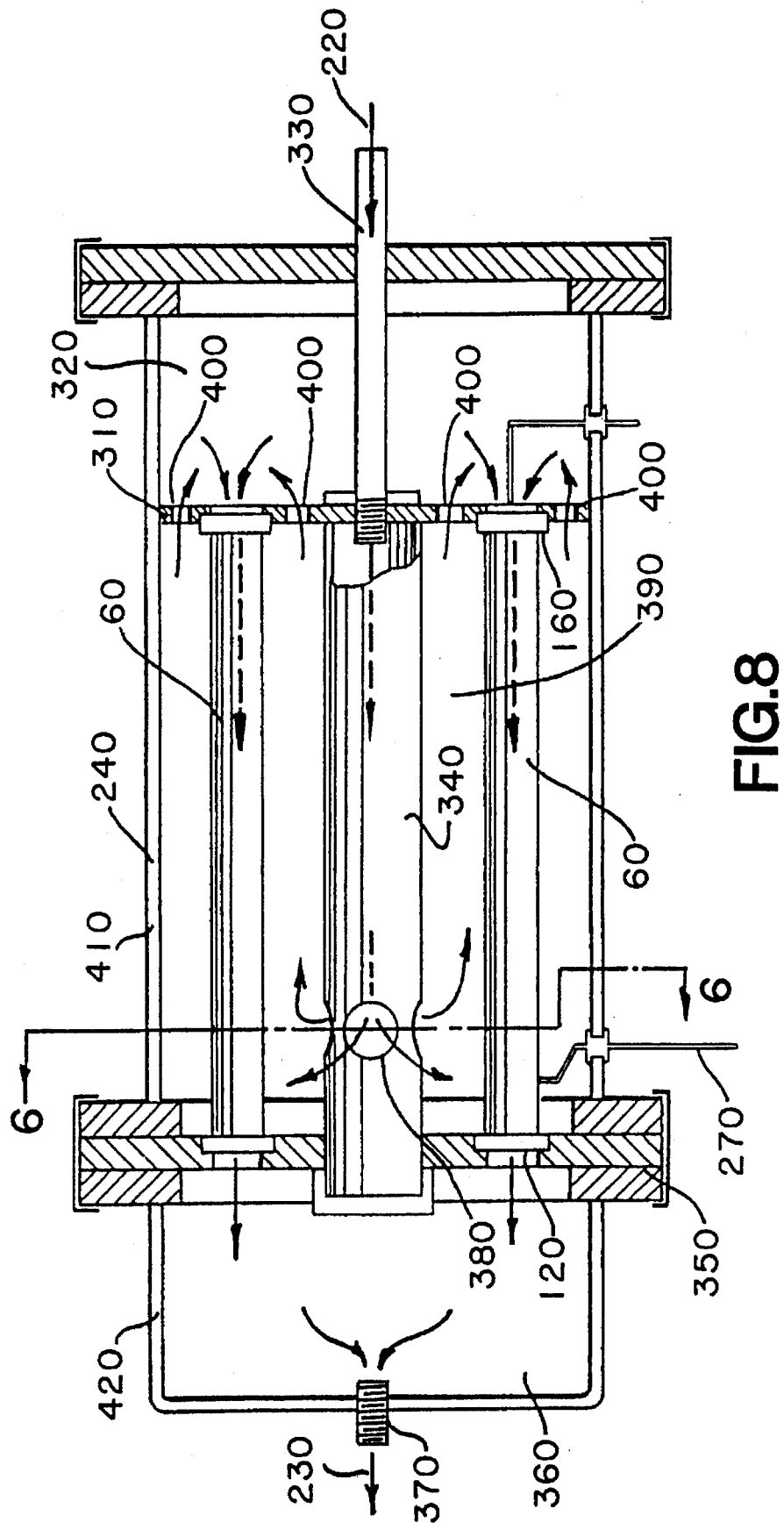
FIG. 8 is a longitudinal, axial cross-section, schematic diagram of the apparatus shown in FIG. 7, showing the flow of gas through a multi-cell preferred embodiment of the apparatus of the present invention.

As shown in FIG. 1, in a preferred embodiment of the present invention, ozone generator 10 has first and second dielectric means, 20 and 60, first and second spacer means, 120 and 160, first and second electrode means, 30 and 70, electric power supply means 280 (FIG. 7), and feed gas supply means 220 (FIG. 8).

In a preferred embodiment of the present invention, first and second dielectric means 20 and 60, are glass tubes, having inner and outer surfaces, 21 and 22, and 61 and 62, respectively. The glass tubes of first and second dielectric means are preferably cylindrical in shape and, in a preferred embodiment of the present invention, comprise commercially available borosilicate glass tubes. The dielectric glass tubes are preferably at least 50 mm long and typically 500 mm long, and 1.2 mm thick. In another embodiment of the present invention, dielectric glass tubes are up to 150 mm and 1.4 mm thick. As embodied herein, glass tubes 20 and 60 are substantially the same length, glass tube 60 being slightly longer to be adapted to spacer means 120 and 160.

First dielectric glass tube 20 is preferably smaller in diameter, so that it can be disposed inside the second dielectric glass tube 60, in spaced apart relation to second dielectric glass tube. In a preferred embodiment of the present invention, the first, or inner, glass tube is 24 mm OD in diameter and the second, or outer, glass tube is 36 mm OD in diameter. Other embodiments of the present invention has dielectric glass tubes of 10.2 mm OD and 20 mm OD respectively, and 36 mm OD and 48 mm OD, respectively. Efficient levels of ozone production can be achieved using dielectric glass tubes between 400–600 mm long. Ozone production can be enhanced by proportionately increasing the diameter of the dielectric glass tube elements. Tests with a first (inner) dielectric glass tube 24 mm in diameter and a second (outer) dielectric of glass tube 36 mm in diameter resulted in an almost threefold increase in ozone production (expressed in grams/hour), over that of the 10.2 and 24 mm OD configuration. In a preferred embodiment of the present invention, first and second electrodes 30 and 70, respectively are windings of a suitable conductive wire. As embodied herein, windings 30 and 70 are preferably of aluminum wire. It will be apparent to those skilled in the art that various modifications and variations can be made to electrodes 30 and 70 of the present invention, without departing from the scope or spirit of the invention. For example, windings 30 and 70 can be aluminum, stainless steel, copper, or any other suitable conductor. Further, electrode 30 could be a solid electrode disposed inside inner glass tube 20. Thus, it is intended that the present invention cover the modifications and variations of the invention provided they come within the scope of the appended claims and their equivalents.

As embodied herein, as shown in FIG. 2, stainless steel or aluminum wire 70 is wound around the outer circumference of second dielectric means 60, with each loop of the windings in close proximity to the next. In a preferred embodiment of the present invention, windings 70 are aluminum wire or 316 grade or 304L grade stainless steel wire, although other grades and types of wire can also be used, if desired.

The distance between each winding 70 is a function of the power supply utilized. In a preferred embodiment of the present invention, second electrode windings 70 do not touch each other. Preferably, the spacing between windings 70 is between 0.5 and 1.0 mm.

The inventors have found that a 0.6 mm spacing produces the maximum ozone generation per meter of tube, up to the point of ozone saturation of the apparatus. At that point, further increases in the concentration of ozone are destructive to the production of ozone. This point of saturation is generally a function of the air flow rate, as well as the tube length and the frequency of the applied AC current.

In a preferred embodiment of the present invention, windings 70 are separated by insulator 100. As shown in FIG. 1, in a preferred embodiment of the invention, insulator 100 is monofilament nylon line. Insulator 100 is wrapped around the outer circumference of second dielectric means 60, alternating with windings 70. In this manner, windings 70 rest directly on the outer surface of second dielectric means 60, while insulation 100 separates windings 70 and prevents discharge of electrical current between windings 70.

In a preferred embodiment of the present invention, windings 70 and insulation 100 are taped. As embodied herein, tape 110 comprises vinyl electrical tape to hold second electrode means 70 firmly in place on the outer surface of glass tube 60. In a preferred embodiment of the present invention, one layer of tape 110 is applied, with the gummed side facing radially outward relative to ozone generator 10. A second layer of tape 110 is applied so that their gummed sides are in juxtaposition. In this manner, tape 110 can be applied, and removed if necessary, without fouling windings 70 or insulation 110 and without damaging the windings 70 or insulation 100.

Ultraviolet radiation in the cavity between first and second electrodes may contribute to ozone formation. In order to maximize the contribution of this effect to ozone production, white vinyl tape is used in a preferred embodiment of the present invention. In this manner, ultraviolet radiation striking the tape is reflected back into the area between the electrodes, enhancing the production of ozone.

In a preferred embodiment of the present invention, electrode means 30 can be stainless steel or aluminum wire (FIG. 1) coiled around the inner circumference of first dielectric means 20, with each loop of the windings in close proximity to the next. As embodied herein, inner windings 30 are also touching first dielectric glass tube 20.

In a preferred embodiment of the present invention, windings 30 are aluminum wire or 316 grade or 304L grade stainless steel wire, although other grades and types of wire can also be used, if desired. Further, the inventors have found that solid electrode (FIG. 2) can be substituted for windings 30 of first electrode, with a minor decrease in the efficiency of the performance of the ozone generator 10. The distance between each inner winding 30 is important in that, windings 30 are placed in close proximity.

In a preferred embodiment of the present invention, both sets of windings 30 and 70 are abutting the inner and outer surfaces of glass tubes 20 and 60, respectively. In order to keep windings in proximity to the tubes, while facilitating ease of assembly, winding 30 is wound as a spring having an outer diameter slightly larger then the inner diameter of glass tube 20. Spring 30 is extended, reducing its diameter, disposed inside glass tube 20, and released, allowing the spring to attempt to regain its original shape and diameter. The expansion of spring 30 is thereby restrained by inner diameter of inner tube 20, maintaining windings 30 in juxtaposition to inner surface 21 of inner tube 20. Similarly, winding 70 is wound as a spring having an inner diameter slightly smaller then the outer diameter of glass tube 60. Spring 70 is unwound slightly, increasing its diameter, and slid over the outside of outer glass tube 60. Spring 70 is then released, allowing it to attempt to regain its original shape and diameter. The contraction of spring 70 is restrained by outer diameter 62 of outer tube 60, maintaining windings 70 in juxtaposition to outer surface 62 of outer glass tube 60

The inventors have found that there is an optimal relation between the configurations of first and second electrodes 30 and 70. In particular, first and second windings can comprise wire of different diameters and construction. The number of windings of the outer electrode wire 70 can vary, as can the distance apart and pitch of each winding. The present inventors believe that the mass of first and second electrodes, however, should be substantially the same, in order to achieve optimum ozone production. Hence, in view of the smaller diameter inner tube 20 relative to outer tube 60 and, consequently, of first electrode windings 30 relative to second electrode windings 70, second windings 70 will typically be spaced apart more widely, all other characteristics of windings 30 and 70 being equal. Similarly, if a smaller gauge of wire is used for one of the electrodes, the spacing should be adjusted accordingly.

In a preferred embodiment of the present invention, first and second electrodes extend along first and second dielectric means substantially the same distance. Moreover, both first and second electrodes preferably terminate a distance 40 and 80 from first and second end caps 160 and 120, along first and second glass tubes, 20 and 60, respectively, sufficient to prevent arcing of the electric current around the ends of first and second glass tubes 20 and 60.

As each cycle of AC current passes along the wire, each winding forms a corona between the second electrode 70 and first electrode 30. The AC current normally oscillates between 50 and 60 cycles per second, the corona discharge created between the electrode windings and the central core will create between 100 and 120 rolling discharges per second respectively. Thus, an ozone producing apparatus in accordance with the present invention comprising between 3 and 300 or more windings will have an effectively continuous corona discharge between the two electrodes over the length of the windings. At AC frequencies up to 700 cycles per second, the efficiency of ozone production is increased threefold, relative to that produced at 50 cycles per second.

In a preferred embodiment of the present invention, it is desirable to maintain the spacing between the dielectric glass tubes within certain ranges. The precise range of spacing that will achieve efficient ozone production depends upon the size of the ozone generating unit for a given AC current, voltage, gas flow rate, and gas quality.

In various prior ozone generating units, it has been found that the distance between the electrodes is extremely sensitive to even minor variations in spacing over the length of the ozone generator. If the proper spacing is not maintained between the electrodes in the apparatus known prior to the present invention, arcing can result with consequent loss of power and reduced production of ozone. Moreover, arcing of the high voltage electric current typically used in ozone generators can lead to damage to the ozone generator unit. Hence, the distance between the electrode components has generally been considered by persons skilled in the art of ozone production to be critical. The prior art has established a critical relationship for the electrical resistance between the electrodes and the applied voltage.

The inventors believe that the present invention provides greater tolerance of variation in the spacing between the electrodes than previously known. Nonetheless, the spacing between first and second electrodes 30 and 70 must be maintained within certain ranges. The tolerance that has been found to be acceptable is 0.1 mm. The gap between the dielectric layer has been found to be a function of the resistance of the dielectric and the air gap, typically dielectric thickness of 1.2 mm, each layer, is suitable for use with a 4.6 mm air gap.

In a preferred embodiment of the ozone generator of the present invention, first end second dielectric glass tubes 20 and 60 are disposed in nested relation so that the distance between them is substantially constant throughout their longitudinal extent. The inner glass tube 20 is maintained concentrically to the outer dielectric glass tube 60 at each end and along its length by first and second spacer means 160 and 120. In a preferred embodiment of the present invention, spacer means comprise first and second end caps 160 and 120, respectively.

As shown in the embodiment depicted in FIG. 1, end caps 120 and 160 comprise UV-resistant and ozone-resistant PVC plastic. In a preferred embodiment of the present invention, end caps 120 and 160 are adapted to hold glass tubes 20 and 60 in place in proper alignment. The faces 121 and 161 of end caps 120 and 160 distal to the center of ozone generator 10 are substantially planar and are disposed substantially perpendicular to the axis of tubes 20 and 60. The faces 122 and 162 of end caps 120 and 160, proximal to the center of apparatus 10, extend proximally toward the center of apparatus 10 and further comprise a step-wise construction, moving radially outward from the axis of tubes 20 and 60.

In a preferred embodiment of the present invention, as shown in FIG. 1, first end cap 160 is disposed on the inlet side 11 of apparatus 10. As embodied herein, and shown in FIG. 1, end cap 160 further comprises three elements: a first tube centering flange 180, a second tube centering flange 170 and end flange 163.

In a preferred embodiment of the present invention, first tube centering flange 180 is adapted to receive first tube 20. First tube centering flange 180 is dimensioned so that it fits snugly inside the inner diameter of first tube 20 and is adapted to maintain first tube in proper axial alignment and in spaced-apart relation relative to second tube 60.

In a preferred embodiment of the present invention, second tube centering flange 170 is adapted to receive second tube 60. Second tube centering flange 170 is dimensioned so that it fits snugly inside the inner diameter of second tube 60 and is adapted to maintain second tube in proper axial alignment and in spaced-apart relation relative to first tube 20.

In a preferred embodiment of the present invention, as shown in FIG. 1, the radial margin 164 of end flange 163 of first end cap 160 extends radially outward, beyond the outer circumference of outer glass tube 60. In another embodiment, shown in FIGS. 4 and 5, end 164 of flange 163 extends so that it is flush with the outer circumference of outer tube 60.

In a preferred embodiment of the present invention, end cap 160 has first apertures 190 formed therein, extending from the distal, planar face 161 of first end cap 160, through its axial extent to the reaction chamber on the proximal side of second tube flange 162, between first tube 20 and second tube 60. As embodied herein, first apertures 190 admit feed gas into reaction chamber 12, formed between first and second glass tubes 20 and 60, and first and second end caps 160 and 120.

As embodied herein, first end cap 160 further comprises second aperture 200 and sheath 210. Second aperture 200 is adapted to permit lead 50 for first electrode 30 to pass through first end cap 160. Second aperture 200 is adapted for ease of assembly of electrode 30 and lead 50# in first tube 20. Sheath 210 is adapted to maintain lead 50 snugly within second aperture 200 and to provide additional electrical insulation.

In a preferred embodiment of the present invention, as shown in FIG. 1, first end cap 160 is disposed on the inlet side 11 of apparatus 10. In this position, electrode 30 and lead 50 are separated physically from the flow of ozone, reducing the chances of arcing and shorting of the apparatus.

As shown in the present preferred embodiment of the present invention, depicted in FIG. 1, second end cap 120 is disposed in the outlet side 13 of apparatus 10. Second end cap 120 further comprises three elements: a first tube centering flange 140, a second tube centering flange 130 and end flange 123. In a preferred embodiment of the present invention, first tube centering flange 140 is adapted to receive first tube 20. First tube centering flange 140 is dimensioned so that it fits snugly inside the inner diameter of first tube 20 and is adapted to maintain first tube in proper axial alignment and in spaced-apart relation relative to second tube 60. Further, second end cap 120 and first and second tube centering flanges 140 and 130 are adapted to maintain tubes 20 and 60 in proper radial, spaced-apart relation relative to each other over the length of tubes 20 and 60.

In a preferred embodiment of the present invention, second tube centering flange 130 is adapted to receive second tube 60. Second tube centering flange 130 is dimensioned so that it fits snugly inside the inner diameter of second tube 60 and is adapted to maintain second tube in proper axial alignment and in spaced-apart relation relative to first tube 20.

In a preferred embodiment of the present invention, as shown in FIG. 1, the radial margins 124 of end flange 123 of second end cap 120 extend radially outward beyond the outer circumference of outer tube 60. In another embodiment of the present invention, as shown in FIGS. 4 and 5, radial margin 124 extends outward only until it is flush with the outer circumference of outer tube 60.

In a preferred embodiment of the present invention, end cap 120 has first apertures 150 formed therein, extending from the distal, planar face 121 of second end cap 120, through its axial extent to the reaction chamber 12 on the proximal side of second tube flange 122, between first tube 20 and second tube 60. As embodied herein, first apertures 150 allow ozone plus any unreacted feed gas to escape from reaction chamber 12.

In a preferred embodiment of the present invention, as shown in FIG. 1, second end cap 120 is disposed on the outlet side 13 of apparatus 10. In this position, second electrode 70 and lead 90 are separated physically from the flow of ozone, reducing the chances of arcing and shorting of the apparatus.

As embodied herein, first and second end caps 160 and 120 support first and second dielectric glass tubes 20 and 60 at their ends, so that their surfaces are substantially equidistant throughout the longitudinal length of the tubes and the tubes are maintained in spaced-apart relation so that the tubes are not touching. Moreover, although the inventors believe that the present invention is less sensitive to variation in the spacing between the electrodes as are prior ozone generators, the distance between the dielectric glass tubes should be substantially uniform.

Figure 6:
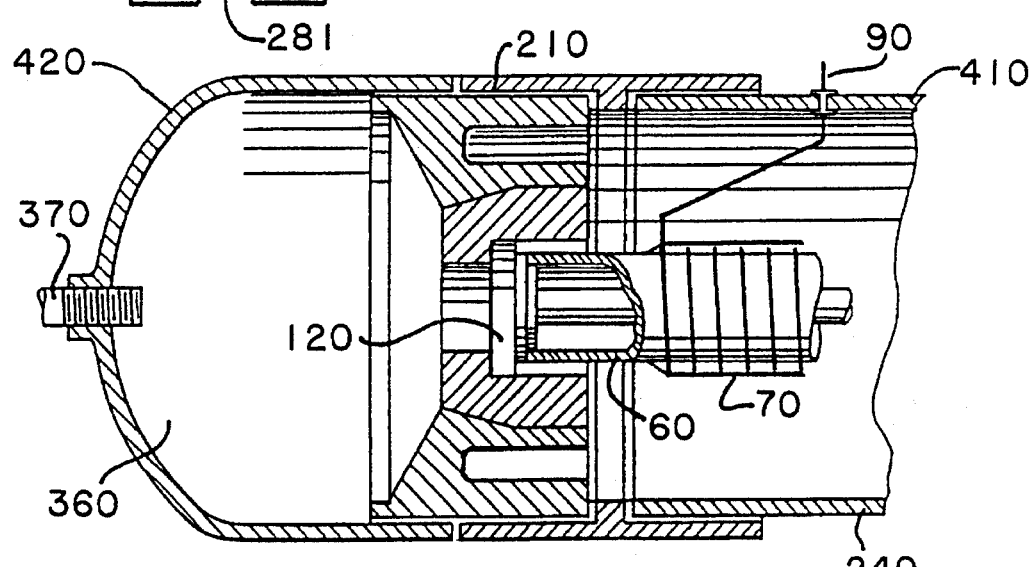
FIG. 6 is a transverse, cross-section, cut-away, schematic diagram of one end of an embodiment of the apparatus of the present invention as shown in FIG. 4, showing a single unit ozone generator cell mounted in an outer shell and, in particular, the sealing of various joints of the apparatus.

In a preferred embodiment of the present invention, ozone generator 10 is assembled using appropriate sealant means 210. Sealant 210 is UV-resistant and ozone-resistant. As embodied herein, sealant 210 is used to attach end caps 120 and 160 to first and second tubes 20 and 60. As shown in FIG. 6, sealant 210 is also used to seal the external components of ozone generator 10 against dust, moisture, and other environmental insults.

As embodied herein, the ozone generator of the present invention includes an electric power supply 280, appropriate control systems 290, and associated wiring 281. In a preferred embodiment of the present invention, ozone generator 10 can be powered from a 240 volt, 50 Hz, AC power supply. A power transformer (neon transformer) has been used to provide 15,000 volts with 60 mA capacity. As shown in FIGS. 7 and 8, the outer electrode 70 is connected by leads 90 and 250, busbar 260, lead 270, control 290 and lead 281 to one terminal of the transformer 280. The inner electrode 30 is connected by lead 50 and similar busbar and leads to control 290, and to the other terminal of transformer 280. Electrodes 30 and 70 are not wired together but rather terminate inside tube 20 and outside tube 60, respectively. Through the electrical excitement of the gas feed a discharge occurs between the windings and the electrodes producing a stable multiple corona.

Ozone production can be regulated by reducing the voltage from 15,000 volts or by varying the flow rate of gas feed. When the current is flowing, the silent electric discharge between electrodes 30 and 70 through the gas in the volume between inner glass tube 20 and outer glass tube 60, changes molecular oxygen into ozone. As embodied herein, the power consumption per kilogram of ozone is between 5.0 and 12.0 kw hours, depending upon the air quality, when air is injected into the unit at 10 Kpa to 100 Kpa (gauge).

It will be apparent to those skilled in the art that various modifications and variations can be made to the apparatus and method for generating ozone of the present invention and in the construction of the power supply 280 and associated controls 290, without departing from the scope or spirit of the invention. For example, power supply 280 could be any appropriate power supply system. Further, control 290 could be electronic control or power conditioning equipment, including equipment relying on microprocessor control based upon feedback information from apparatus 10 to enhance the production of ozone. Thus, it is intended that the present invention cover the modifications and variations of the invention provided they come within the scope of the appended claims and their equivalents.

In preferred embodiment of the present invention, ozone generator 10 further comprises feed gas supply means 220. As embodied herein, feed gas supply means 220 further comprises an air compressor or bottled oxygen, cooler, dryer, moisture trap, dust filter, nozzle 330, and associated piping and controls. These components are standard air handling elements, of the type known in the art.

The feed gas must be some appropriate gas containing molecular oxygen. As embodied herein, either air or oxygen is used as the feed gas. The feed gas is preferably pre-filtered with activated carbon to remove hydrocarbons, although the unit will operate effectively without pre-filtering.

In a preferred embodiment of the present invention, the air supply to apparatus 10 of the invention would normally pass through a commercial moisture trap and dust filter to ensure that moisture or dust is not present in reaction chamber 12. Excess moisture and/or dust could cause short-circuiting of the apparatus, with consequent reduction of efficiency. Accordingly, in a preferred embodiment of the present invention, an air dryer is installed to achieve a dew point of $-40°$ to $-60°$ C. In a preferred embodiment of the present invention, the feed gas is preferably dried down to a dew point of a minimum of $-40°$ C. This can be achieved by using an oil-less air compressor and heat-less air dryer. Alternatively small units can be fitted with moisture absorbing crystals to achieve at least $-40°$ C. dew point.

In accordance with the present invention, efficient ozone generation is achieved with low air flow rates of approximately 4 liters per minute. Efficient ozone generation has also been achieved with the present invention with low pressures. However, higher generation efficiency and production quantity is achieved with somewhat higher pressures.

It will be apparent to those skilled in the art that various modifications and variations can be made to the feed gas supply means of the present invention and in the construction of the feed gas supply means of the invention, without departing from the scope or spirit of the invention. For example, depending upon the application, the use, and the concentration of ozone needed, various of the above air handling components may be eliminated, or added. Further, depending upon the application, affirmative feed gas pressure need not be supplied. In an application such as room deodorizing, with the apparatus oriented with its longitudinal axis vertical, diffusion of ozone out of the lower end of the cell may provide sufficient pressure differential to draw adequate quantities of feed gas supply air into the upper end of apparatus 10. Thus, it is intended that the present invention cover the modifications and variations of the invention provided they come within the scope of the appended claims and their equivalents.

In a preferred embodiment of the method of the present invention, feed gas, in the form of pressurized air or oxygen is injected into an annular space between the concentric dielectric glass tubes 20 and 60 through feed gas supply means 220. The feed gas passes between borosilicate glass dielectric tubes.

The center of inner tube 20 is occupied by first electrode 30. The potential difference of a voltage between about 7,000 and 60,000 volts AC is applied to the outer windings 30 and 70. The potential difference between the windings 30 and 70 causes a corona discharge to occur between the two dielectric glass layers and the feed gas supplied to the ozone generator. The air passing through the annular gap between the layers is introduced by a nozzle. The gases containing molecular oxygen are partially conductive. In a preferred embodiment of the invention, feed gas is supplied by feed gas supply means 220 at a velocity so that the ozone produced in ozone generator 10 passes out of the apparatus before a concentration of ozone sufficient to cause short circuiting occurs.

The efficiency of this example is in the range of 5% to 40%, in terms of the oxygen transformed to ozone. In air, this means that 1% to 8% of its weight is converted to ozone, since approximately 20% of air is molecular oxygen.

The preferred air flow rate depends on a number of factors, including the size of the apparatus, the concentration of ozone required to be produced, and the size and arrangement of the elements comprising the apparatus. For example, if air is injected at a rate of 8 liters of air per minute into a preferred embodiment of the apparatus of the present invention, the apparatus can produce up to 6.5 grams of ozone per hour, when measured at STP (standard temperature and pressure).

In the present example, the temperature rise in the air discharge is in the order of $2°$ to $3°$ C., which indicates that the unit is operating very efficiently, especially when compared with prior art units. No cooling system is, therefore, necessary.

The efficiency of ozone production will be improved if the gas is cooled and has a low dew point before passing through the corona discharge region. If gas under high pressure is used, the compression process will normally raise the temperature of the gas. Therefore, cooling can be applied to the gas either to reduce it to room temperature, or even below room temperature if necessary.

A further advantage of cooling the feed gas before subjecting it to the corona discharge is that, when dissolving ozone in water, the lower the temperature of the ozone, the higher the ozone concentration that can be dissolved. Further, since cooler gas is more dense, using a cooler feed gas will enhance the efficiency of the ozone production process.

This is particularly useful in using ozone to treat wastewater and to disinfect water supplies. Ozone has many advantages in the treatment of water, and is eventually a harmless additive, as unreacted ozone inevitably returns to the atmosphere as molecular oxygen. The dose rate of ozone to disinfect clean water may be as little as 0.1 to 0.2 mg/liter, whereas heavily contaminated wastewater may require up to 30 mg/liter to completely disinfect it. Therefore, it can be seen that a cheap, effective method of producing ozone has great potential in water treatment, as well as in the previously known uses.

In a preferred embodiment of the present invention, ozone generator 10 further comprises outer shell 240, first and second support plates 310 and 350, inlet nozzle 330, inlet or feed gas plenum 320, distributor manifold 340, feed gas distribution apertures 380, central cavity 390, feed gas circulation apertures 400, outlet plenum 360, and outlet nozzle 370.

As shown in the embodiments depicted in FIGS. 4, 6, 7, and 8, ozone generating unit 10 is located in outer shell 240, supported by first and second support plates 310 and 350. As embodied herein, outer shell 240 protects ozone generator from environmental insult. For example, when used in moist, hot, or dusty conditions, outer shell prevents fouling or overheating of the ozone generator from external sources. In addition, mounting ozone generator 10 in outer shell 240 allows feed gas to be circulated around outer windings 70, venting the unit. In a preferred embodiment of the present invention, a single ozone generator can be mounted in outer shell 240, as shown in FIGS. 4 and 6, or multiple units can be mounted in outer shell 240, as shown in FIGS. 7 and 8.

As embodied herein, the individual generating units 10 are held firmly within the casing by first and second support walls 310 and 350. A preferred construction of the casing is to use UV-resistant and ozone-resistant PVC pipe 410 with glued on end caps 420; each end having the centrally located inlet or outlet. In a preferred embodiment of the present invention, as noted above, these parts are sealed with an appropriate sealant 210. In a preferred embodiment of the present invention, Class 6 to 18 PVC pipe is used. Outer shell 240 protects the ozone generator 10 from damage in industrial use.

PVC pipe is known to be suitable for use in ozone containing atmospheres, and in use, it has been found that this material is not measurably degraded by ozone. PVC also provides good electrical insulation to the apparatus. A large number of units can be provided together in parallel to produce a greater supply of ozone, if necessary.

FIG. 8 depicts the flow of feed gas around a bank of ozone generator units, to cool the outer windings or simply to reduce the temperature of the ozone generator when it is exposed to external heat sources, such as being placed in the direct sun. Feed gas is generated by feed gas delivery means 220 and enters the apparatus through inlet gas supply tube, or nozzle 330. As shown in FIG. 8, in a preferred embodiment of the present invention, feed gas enters feed gas distribution manifold 340, exits manifold through distribution apertures 380 and flows into central cavity 390. In central cavity 390 feed gas contacts tape 110 covering electrodes 70, providing additional cooling, or preventing the buildup of excess heat from external sources.

As embodied herein, feed gas then exits cavity 390 through apertures 400 formed in first support plate. At this point, feed gas enters inlet plenum 320, and flows through individual ozone generator units as described above. After exiting the ozone generators, ozone and the unreacted fraction of the feed gas are discharged into outlet planum 360 and out of the apparatus through outlet tube or nozzle 370.

The apparatus and method of the present invention has been found to be economic in its production of ozone. A unit with 203 windings has a capacity to produce over 5 grams ozone per hour. If additional ozone is required, then several such units can be arranged in parallel to produce multiples of this amount.

In a preferred embodiment of the present invention, multiple unit ozone generating cells can be combined to increase the amount of ozone generated for specific applications. In one embodiment of the present invention, outer shell 240 has a diameter of 160.25 mm and a length of 650 mm. As embodied herein, outer shell 240 can house up to 5 separate ozone producing units.. A preferred embodiment of the apparatus of the present invention is shown in FIG. 7 and 8 and comprises eight (8) ozone generator units housed in a single outer shell. As embodied herein, ozone generator 10 has an outer shell 240 and multiple ozone generator units 10 mounted inside outer shell 240. Units of such configuration with larger diameter outer shell 240 can house up to 24 separate ozone producing units or more if desired. The present invention also concerns the apparatus and methods referred to above whereby the production of ozone is monitored by the use of an Ultraviolet LED (light emitting diode) which emits light having a frequency of 253.7 nm. Light of this frequency is reflected by ozone and, by measuring the light intensity a certain distance from the LED, the concentration of ozone in the air stream can easily be calculated. With the present apparatus, providing it is not within the light field from the corona discharge, the ozone measuring unit can be calibrated with standard chemical titration, such as that using potassium iodide as described in the standard reference text "Standard Methods", 16th edition.

EXAMPLE 1

The ozone cell consists of two (2) concentric tubes of a dielectric material, preferably borosilicate glass. The inner glass cell must be set inside the outer cell and held equidistant apart by plastic end pieces. The plastic end pieces are preferably PVC or other ozone resistant material and have small holes drilled to allow the air or oxygen feed gas to pass through.

The preliminary glass dielectric cell sizes have been:

inner cell −24 mm diameter thickness 1.2 mm outer cell −36 mm diameter thickness 1.2 mm The inner glass tube contains an electrode centrally located. This electrode can be either a solid rod or windings consisting of stainless steel or aluminum.

The outer glass tube has a plurality of windings of a conductive wire around its outer surface preferable stainless steel (316 or 304L) or aluminum. The wire thickness can be 0.5 to 2.0 mm and galvanically separated by a monofilament nylon line. The number of windings will depend on the gap separation and the length of the glass tube. Minimum length of the cell can be 50 mm with at least 3 windings.

Efficient levels of ozone are achieved with glass cell lengths between 400 and 600 mm and between 200 to 300 windings. Further development has demonstrated that higher levels of ozone production can be achieved by proportionally increasing the size of the glass cells. Recent tests with inner tube of 24 mm diameter and outer cell of 36 mm diameter produced nearly three (3) times the ozone production level expressed in grams/hour, over that of 10.2 and 24 mm diameter tubes.

Either one or more of the ozone cell units (inner and outer) can be mounted and held in position by a PVC plate mounted inside a PVC pipe. This fitting will allow the annular gap to have air or oxygen pass through and convert part of the oxygen component into ozone. Twelve cells have been mounted within an extruded 300 mm diameter PVC pipe.

EXAMPLE 2

The following results were obtained based upon experiments conducted using a preferred embodiment of the apparatus and method of the present invention as shown in FIG. 1:

| Weight of unit: | 2.5 kg |
| --- | --- |
| 1. Gas feed:    Feed rate:    Gas pressure:    Ozone production:    Gas Dew Point: | air    8 litres per minute (0.480 m3/hour)    14 KPa inside cell    6.5 grams per hour    −30° C. |
| 2. Gas feed:    Feed Rate:    Gas pressure:    Ozone production:    Gas Dew Point | oxygen    4 litres per minute (0.240 m3/hour)    14 KPa inside cell    10.0 grams per hour    -35° C. |

EXAMPLE 3

FIGS. 4 and 5 shows an apparatus of the present invention containing a single ozone generating unit. At the ends of the unit are end caps support 120 and 160. The outer electrode consists of stainless steel wire 70 having a diameter of 1.2 mm. The outer diameter of the windings is 38.4 mm. The inner electrode 30 is a stainless steel 316 rod having a diameter of 21.6 mm. Surrounding the rod 30 is a borosilicate glass tube 20, also with a wall thickness of 1.2 mm. Supporting the unit are a PVC tube baffle and support plates 310 and 350. The air inlet nozzle 330 has a diameter of 4 mm, as does the outlet 370. The total diameter of the outer shell 240 is nominally 115 mm, and the length is 440 mm.

In this example, the high voltage current is connected to the inner electrode, and outer electrode. The arrangement shown in FIGS. 4 and 5 is capable of producing up to 4 g of ozone, per hour, from an air feed and 9 g per hour from an oxygen feed, both at a dew point of −40° C. The desireable −40° to 60° C. dew point is achieved by installing an air dryer between the air/oxygen supply and the unit. Alternatively instrument air or dry oxygen from a bottled source can be utilized.

It will be apparent to those skilled in the art that various modifications and variations can be made in the ozone generator of the present invention without departing from the scope or spirit of the invention. Hence, it is intended that the present invention cover the modifications and variations of the invention, provided they come within the scope of the appended claims and their equivalents.

I claim:

1. An apparatus for producing ozone, comprising, first and second dielectric means, each further comprising first and second surfaces;

said first dielectric means being disposed in spaced-apart relation to said second dielectric means, whereby said second surface of said first dielectric means is disposed in spaced apart and opposing relation to said second surface of said second dielectric means;

first and second spacer means, for maintaining said first and second dielectric means in substantially spaced-apart relation to one another;

a reaction chamber comprising the volume between said first and second dielectric means;

said reaction chamber being adapted to receive volume of gas comprising molecular oxygen;

first electrode means disposed in along said first surface of said first dielectric means;

second electrode means disposed along said second surface of said second dielectric means in substantially parallel relation to said first electrode means wherein said second electrode means comprises a winding of conductive wire disposed on said second surface of said second dielectric means, said windings being separated by a solid insulator;

means for supplying gas containing molecular oxygen to said reaction chamber;

means for supplying electrical power to said first and second electrode means, to induce a corona discharge in said gas comprising molecular oxygen whereby said corona discharge converts some of said gas comprising elemental oxygen to ozone; and wherein said reaction chamber is adapted 1o discharge a mixed stream of gas comprising ozone and the unreacted fraction of said volume of gas comprising molecular oxygen.

2. The apparatus for producing ozone of claim 1, wherein said ozone generator further comprises a outer shell and multiple ozone generating units disposed within said outer shell.

3. The apparatus for producing ozone of claim 1, wherein said dielectric means comprise substantially cylindrical glass tubes.

4. The apparatus for producing ozone of claim 1, wherein said dielectric means comprise borosilicate glass tubes.

5. The apparatus for producing ozone of claim 1, wherein said dielectric means further comprise substantially cylindrical glass spacer of dielectric material having first and second ends and said spacer means further comprise PVC end caps adapted to maintain said dielectric means in spaced-apart relation.

6. The apparatus for producing ozone of claim 3, wherein said glass tubes further comprise first and second ends and wherein said feed gas is supplied to said first end and ozone enriched gas is expelled from said second end.

7. The apparatus for producing ozone of claim 1, wherein said first electrode means comprises a solid conductive metal rod, disposed on said first surface of said first dielectric means.

8. The apparatus for producing ozone of claim 1, wherein said first electrode means comprises a winding of conductive wire disposed along said first surface of said first dielectric means and second electrode means comprises a winding of conductive wire disposed on said second surface of said second dielectric means.

9. An apparatus for producing ozone, comprising, first and second substantially cylindrical dielectric means, forming first and second walls respectively of a reaction chamber, each of said first and second dielectric means comprising axial and radial directions, and inner and outer surfaces;

said first dielectric means having a radius less than said radius of said second dielectric means, and said first dielectric means being disposed inside said second dielectric means in substantially parallel axial relation to said second dielectric means;

said reaction chamber having first and second ends;

said first end of said reaction chamber being adapted to receive a volume of gas comprising molecular oxygen;

first electrode means disposed on said inner surface of said first dielectric means along said axial direction of said first dielectric means;

second electrode means disposed on said outer surface of said second dielectric means along said axial direction of said second dielectric means wherein said second electrode means comprises a winding of conductive wire disposed on said second surface of said second dielectric means, said windings being separated by a solid insulator;

means for supplying electrical power to said first and second electrodes;

whereby said electrical power supplied to said electrodes induces a corona discharge is said gas comprising molecular oxygen which converts some of said gas comprising elemental oxygen to ozone; and whereby said second end of said reaction chamber is adapted to discharge a mixed steam of gas comprising said unreacted fraction of said volume of gas comprising molecular oxygen and ozone.

10. The apparatus for producing ozone of claim 9, wherein said ozone generator further comprises a outer shell and multiple ozone generating units disposed within said outer shell.

11. The apparatus for producing ozone of claim 9, wherein said dielectric means comprise substantially cylindrical glass tubes.

12. The apparatus for producing ozone of claim 9, wherein said dielectric means comprise borosilicate glass tubes.

13. The apparatus for producing ozone of claim 9, wherein said spacer means further comprise PVC end caps adapted to maintain said dielectric means in spaced-apart relation.

14. The apparatus for producing ozone of claim 9, wherein said first electrode means comprises a solid conductive metal rod, disposed on said inner surface of said first dielectric means.

15. The apparatus for producing ozone of claim 9, wherein said first electrode means comprises a winding of conductive wire disposed along said inner surface of said inner dielectric means and said second electrode means comprises a winding of conductive wire disposed on said outer surface of said second dielectric means.

16. An apparatus for producing ozone, comprising, first and second dielectric glass tubes, forming first and second walls respectively of a reaction chamber of the apparatus, each of said first and second dielectric glass tubes having axial and radial directions, inner and outer surfaces, and first and second ends;

said first dielectric glass tube having a radius less than said radius of said second dielectric glass tube and said first dielectric glass tube being disposed inside said second dielectric glass tube and in substantially parallel axial relation to said second dielectric glass tube;

whereby said outer surface of said first dielectric glass tube forms said first wall of said reaction chamber and said first wall of said reaction chamber is disposed in spaced-apart relation to said inner surface of said second dielectric means forming said second wall of said reaction chamber;

first electrode means disposed on said inner surface of said first dielectric means along said axial direction of said first dielectric means;

second electrode means disposed on said outer surface of said second dielectric means along said axial direction of said second dielectric means wherein said second electrode means comprises a winding of conductive wire disposed on said second surface of said second dielectric means, said windings being separated by a solid insulator;

means for supplying electrical power to said first and second electrodes;

said reaction chamber having first and second ends, corresponding to said first and second ends of said dielectric glass tubes;

an inlet nozzle disposed in said first end of said reaction chamber for injection into said reaction chamber, at a velocity sufficient to prevent short circuiting of the apparatus, a volume of gas comprising molecular oxygen;

whereby said electrical power supplied to said electrodes induces a corona discharge in said gas comprising molecular oxygen which converts some of said gas comprising elemental oxygen to ozone;

an outlet aperture formed in said second end of said reaction chamber for discharging a mixed stream of gas comprising said unreacted fraction of said volume of gas comprising molecular oxygen and ozone.

17. The apparatus for producing ozone of claim 16, wherein said ozone generator further comprises a outer shell and multiple ozone generating units disposed within said outer shell.

18. The apparatus for producing ozone of claim 17, wherein said outer shell further comprises a fed gas distribution manifold for distributing said feed gas around the outer surface of said ozone generating units prior to injecting said feed gas into said reaction chamber.

19. The apparatus for producing ozone of claim 16, wherein said dielectric means comprise borisilicate glass tubes.

20. The apparatus for producing ozone of claim 16, wherein said ozone generator further comprises spacer means, further comprising PVC end caps adapted to maintain said dielectric means in spaced-apart relation.

21. The apparatus for producing ozone of claim 16, wherein said first electrode means comprises a solid conductive metal rod, disposed on said inner surface of said first dielectric means.

22. The apparatus for producing ozone of claim 16, wherein said first electrode means comprises a winding of conductive wire disposed along said inner surface of said inner dielectric means and said second electrode means comprises a winding of conductive wire disposed on said outer surface of said second dielectric means.

23. The apparatus for producing ozone of claim 22, wherein, the mass of said first and second electrodes is substantially the same.

24. The apparatus for producing ozone of claim 22, wherein the axial extent of said first and second electrodes is substantially the same.

* * * * *